United States Patent [19]

Wollrich

[11] Patent Number: 5,603,836
[45] Date of Patent: Feb. 18, 1997

[54] METHOD OF USING A DIATOMACEOUS EARTH CONTAINING ADSORBENT

[76] Inventor: Gary W. Wollrich, 4048 Beck Ave., Studio City, Calif. 91604

[21] Appl. No.: 158,277

[22] Filed: Nov. 29, 1993

Related U.S. Application Data

[62] Division of Ser. No. 994,686, Dec. 22, 1992, Pat. No. 5,266,547, which is a division of Ser. No. 767,879, Sep. 30, 1991, Pat. No. 5,213,690.

[51] Int. Cl.⁶ .................................................. B01D 15/00
[52] U.S. Cl. ................................................ 210/660; 134/7
[58] Field of Search ................... 95/143–147; 134/7, 134/25.1; 210/660, 679–681, 691, 693, 924, 928, 690

[56] References Cited

U.S. PATENT DOCUMENTS

| | | | |
|---|---|---|---|
| 1,555,639 | 9/1925 | Day | 502/408 |
| 1,598,255 | 8/1926 | Prutzman et al. | 502/408 |
| 1,992,547 | 2/1935 | Schuetz | 502/408 |
| 2,044,341 | 6/1936 | Wollner | 502/408 |
| 2,701,240 | 2/1955 | Bregar | 502/408 |
| 5,080,824 | 1/1992 | Bindl et al. | 252/174.15 |
| 5,213,690 | 5/1993 | Wollrich | 210/691 |

*Primary Examiner*—Ivars Cintins

[57] ABSTRACT

An adsorbent composition containing sugar, vinegar, and diatomaceous earth is disclosed. The sugar, vinegar, and diatomaceous earth are preferably added together in about equal amounts by volume or in amounts of about 20 pounds of sugar, 2 gallons of vinegar, and 100 pounds of diatomaceous earth. The adsorbent composition has particular use in adsorbing petroleum oil from soil, water, or air and in water purification.

2 Claims, No Drawings

METHOD OF USING A DIATOMACEOUS EARTH CONTAINING ADSORBENT

This application is a divisional of application Ser. No. 07/994,686, filed Dec. 22, 1992, now U.S. Pat. No. 5,266, 547; which is a divisional of application Ser. No. 07/767, 879, filed Sep. 30, 1991, now U.S. Pat. No. 5,213,690.

BACKGROUND OF THE INVENTION

1. Field of the Invention

The present invention relates to a diatomaceous earth containing adsorbent composition, a method for making this adsorbent composition, and methods for using the adsorbent composition for removing impurities from various materials.

More particularly, the present invention relates to an adsorbent composition comprising diatomaceous earth, sugar, and vinegar combined in relative amounts which result in a composition with good adsorptive capability; methods for making the composition; and methods for using the adsorbent for removing impurities from various materials.

2. Description of the Art

It is known in the art to use silicious materials such as diatomaceous earth as adsorbents. Known silicious adsorbents include naturally occurring substances such as diatomaceous earth as well as Fullers earth and bauxite and man-made adsorbents such as the acid treated clays (e.g., bentonite and monmorillonite), and silica gels produced by reactions between soluble silicates and acids. Silicious materials are well known for their appreciable adsorptive and filtrative ability and are often used in processes of purification wherein purification occurs by adsorption or filtration.

Known applications of silicious adsorbents include the clarification and filtration of industrial liquors; treatment of hydrocarbon oils of the petroleum or vegetable class for the purpose of purification by adsorption, filtration, or bleaching; purification, filtration and decolorizing of gases; and purification, filtration and decolorizing of liquids. Exemplary of prior art references relating to the use of silicious materials as adsorbents, with some specifically relating to diatomaceous earth adsorbents are the following U.S. Pat. Nos. 1,555,639; 1,598,255; 1,634,514; 1,992,547; 2,044, 341; and 2,701,240.

Although diatomaceous earth compositions find wide use as adsorbents, the need still exists in the art for improved adsorbents capable of efficiently removing large amounts of impurities from specific materials. In particular, there is a current need in the art for adsorbents capable of efficiently adsorbing petroleum oils in large amounts from petroleum oil contaminated materials.

The current need is evidenced by the recent worldwide occurrence of numerous environmentally catastrophic oil spills and also by the ongoing situation in Kuwait wherein hundreds of oil wells are burning and creating vast amounts of oil smoke. An adsorbent composition capable of effectively and efficiently adsorbing petroleum oil or smoke from such petroleum oil contaminated areas would be highly beneficial.

Additionally, there is always a need in the art for adsorbents capable of efficiently and effectively adsorbing impurities from water. Accordingly, an adsorbent capable of adsorbing a variety of impurities from water would also be highly beneficial.

OBJECTS AND SUMMARY OF THE INVENTION

Surprisingly, the present inventor has now discovered that an adsorbent composition containing sugar, vinegar and diatomaceous earth makes a highly desirable absorbent composition.

It is a general object of the present invention to provide a novel diatomaceous earth containing adsorbent capable of adsorbing impurities from a variety of different materials or sources, but is particularly capable of adsorbing petroleum oil from a petroleum contaminated environment or is useful in water purification.

It is another object of the invention to provide a method for making a novel diatomaceous earth containing adsorbent composition comprising diatomaceous earth, sugar and vinegar combined in relative amounts which result in a composition with good adsorptive capability.

It is yet another object of the invention to provide specific uses of the novel diatomaceous earth containing adsorbent composition for purification of materials such as soils, water, and air. Applications of particular importance include using the novel adsorbent for adsorption of petroleum oils from petroleum oil contaminated materials and in water purification and desalination. Other objects of the invention include using the adsorbent to adsorb animal wastes, use in fire extinguishers as an adsorbent, use in dry shampoo formulations, use for adsorption of chemicals, use in paint formulations, and use in paper or pulp mills for adsorption of solid impurities.

DETAILED DESCRIPTION OF THE PREFERRED EMBODIMENTS OF THE INVENTION

Prior to discussing the invention in more detail, the following definitions are given so that the meaning of the invention will be clearly understood by those skilled in the art.

"Adsorbent" is used technically in this application to designate a solid substance which possesses the property of attracting to itself and retaining to itself during mechanical separation some "impurity" or group of impurities from a "material" which is placed in contact with the adsorbent.

"Material" in the definition of adsorbent is intended to be any composition containing impurities which are retained by the adsorbent. Such materials in the context of the present invention include liquids, gases and solids.

"Impurity" is intended to be any substance in the "material" which is retained by the adsorbent. Impurities in the context of the present invention include, but are not restricted to, substances including oils, such as petroleum oils, and animal oils; salts; and grease.

The present inventor has discovered that the combination of diatomaceous earth, sugar, and vinegar results in a composition with tremendous adsorptive properties and which is capable of adsorbing a variety of impurities in large amounts from a variety of different materials including water, soil, and air.

As noted above, the present invention is directed to a novel adsorbent containing sugar, vinegar, and diatomaceous earth wherein the three components are combined in relative amounts resulting in a composition with good adsorptive capability. In a preferred embodiment the adsorbent composition will comprise the sugar, vinegar, and diatomaceous earth combined in substantially equal amounts by volume. In an even more preferred embodiment the relative amounts of the three components will be about 20 pounds of sugar, 2 gallons of vinegar, and 100 pounds of diatomaceous earth. The adsorbent resulting from these relative amounts of the three components has been found to exhibit particularly good adsorptive capability and to be particularly stable even after prolonged usage. However, variation of the relative amounts of these materials is within the purview of ordinary skill and considered to be within the scope of the present invention. Any ratio of the three components which results in a composition with good adsorptive capability is intended to be within the scope of the present invention. For example, respective weight ratios of sugar, vinegar, and diatomaceous earth of about 1:1:1, 1:1:5, 1:1:10, 1:1:25, 1:1:50, and 1:1:100 are suitable.

When preparing the subject adsorbent any diatomaceous earth material may be used. Diatomaceous earth materials are known in the art and widely available. The present inventor used, in particular, the diatomaceous earth material marketed under the name "Cellrite".

The vinegar used in the composition can be any commercially available vinegar, although 5% white wine vinegar is particularly preferred. However, variations of the acetic acid concentration of the vinegar used is within the scope of the present invention, for instance, the vinegar may range from about 1% to about 30% acetic acid.

The sugar can be any available sugar. Cane sugar or beet sugar are particularly preferred, although other available sugars such as fructose, glucose, maltose, are intended to be within the scope of the present invention. Selection will, e.g., depend upon which sugars are readily available, and the impurity to be adsorbed.

A preferred means for preparing the adsorbent is described as follows:

The sugar (preferably cane or beet sugar) and the vinegar (preferably 5% white wine vinegar) are mixed together in substantially equal amounts by volume. The diatomaceous earth (e.g., Cellrite) is then added to the resulting vinegar and sugar mixture, again in a substantially equal amount by volume as each of the first two materials. Accordingly, the resulting mixture will comprise roughly one third diatomaceous earth, one third sugar, and one third vinegar by volume. This mixture will have the consistency of a thin syrup. If such a consistency is not obtained, minor modifications or additions of one or more of the three components may be necessary. The preferred mixing ratios would, of course, depend to a great extent on the precise identity of the three components selected.

As stated above, in an even more preferred embodiment about 100 pounds of diatomaceous earth, will be added to about 2 gallons of 5% white wine vinegar and 20 pounds of cane sugar. The resulting adsorbent has the consistency of a powder and works especially well in adsorbing impurities. Preferably water, e.g., sea water, or any aqueous vehicle will be added to this powder so as to obtain an adsorbent formulation having the consistency of a thin syrup.

The resulting product can be used directly as an adsorbent, it may be mixed with water, in particular sea water, prior to use as an adsorbent, or it may be used in combination with a diatomaceous earth filter.

Specific uses for the adsorbent of the present invention include, but are not limited to, the following:

adsorption of petroleum oils from water, air and land;

use in animal breeding for adsorption of animal wastes;

use in fire extinguishers to adsorb oils and greases (adsorbent has no flash point);

use as a dry shampoo capable of adsorbing oil;

use in transformers for adsorption of chemicals used therein;

use in paper or pulp mills for adsorption of solid impurities produced therein;

use in paint formulations, in particular, paints which are to be exposed to salts for prolonged time periods (protects painted surface from salt damage).

use in sewage treatments for adsorption of solid impurities; and use in water purification and desalination.

This list of applications of the subject adsorbent is meant to be exemplary and by no means exhaustive.

The use of the adsorbent for adsorption of petroleum oils and water purification is described in greater detail below.

Use of the Adsorbent for Adsorption of Petroleum Oil or Petroleum Oil Smoke

As discussed above, a preferred use of the subject adsorbent is for the adsorption of oils, in particular petroleum oils, from petroleum oil contaminated materials. These materials include sea water containing oils dispersed therein or sea water with petroleum oil on the surface of the water, oil smoke or clouds produced by burning of petroleum oils, and petroleum oil contaminated soils.

Adsorption of Standing Oil from Water

When adsorbing petroleum oil from water, in particular sea water, the adsorbent can be applied directly to the oil contaminated water in a dry form. It is possible, however, to add an amount of sea water to the adsorbent prior to application of the adsorbent to the petroleum oil containing water to minimize dust formation during application. Suitable volumetric ratios of the adsorbent to the water are, for example, 1:10, 1:100, 1:1000, and 1:10,000. A preferred volumetric ratio of the adsorbent to the water to be purified is about 1:1000. If the water contains a large amount of standing oil, to effectively adsorb the oil it is also preferable to apply some form of agitation or mixing to enable better contact between the adsorbent and the petroleum oil. This would also tend to increase the rate of adsorption. After adsorption, the adsorbent can be removed and the petroleum oil extracted therefrom if so desired.

Adsorption of Oil Smoke or Clouds

The adsorbent can be used to adsorb smoke resulting from burning petroleum oil or clouds of such petroleum oil residue in the air. If used in such a manner, the adsorbent will preferably be applied from an aircraft in a manner similar to crop dusting.

Essentially, the adsorbent will be released above oil containing smoke or clouds. Prior to application the adsorbent can be mixed with water, most preferably sea water again to minimize dust formation. As the adsorbent falls, it will adsorb the petroleum oils and then drop to the ground. This adsorbent can then be recovered from the soil, if desired. However, it is possible that once the adsorbent reaches the ground, it will be dispersed to such an extent that recovery is not necessary.

In particularly heavy oil smoke contaminated areas repeated applications of the adsorbent by the described procedure may be desirable.

Adsorption of Petroleum Oil from the Soil

When the adsorbent is used to adsorb petroleum oil from the soil, e.g., petroleum oil contaminated sand, the adsorbent can be added directly to the sand as prepared or in a dried form. However, it is also possible to mix the adsorbent with water, most preferably sea water. This minimizes dust formation. A ratio of about two parts of the adsorbent to one part of sea water is especially preferred.

Application of the adsorbent can be affected by any convenient means. Spraying of the material onto petroleum oil contaminated soil is preferred. When spraying the compound suitable respiratory protection should be exercised (such as wearing respiratory protective gear).

Use of the subject adsorbent is advantageous in that it results in substantial removal of impurities from the water and yet does not affect the taste of the water. That is, the water does not take on the flavor of the sugar, diatomaceous earth, or vinegar contained in the formulation.

Water Purification

Another preferred use of the subject adsorbent is water purification. The adsorbent can be used in existing water filtration or settling systems as a filtering or adsorbing agent. Proper use of the adsorbent will result in filtration and adsorption of substantially all solid impurities.

For heavily contaminated waters such as sewage containing water or pulp containing water (such as water produced in a paper mill) it may be desirable to purify the water in a multi-stage filtration system containing the subject adsorbent so as to enable maximum removal of impurities.

The previous discussion provides general guidance regarding the use of the subject composition as an adsorbent which would enable the skilled artisan to use the subject adsorbent. It is additionally noted that when using the subject adsorbent certain safety measures should preferably be satisfied.

The subject adsorbent contains crystalline silica which is a putative carcinogen and a causative agent of silicosis, a chronic non-carcinogenic respiratory disease. Accordingly, when using the adsorbent proper care should be exercised to avoid excessive dust formation. Mixing of the adsorbent with water prior to application will minimize dust formation. However, if an excessive buildup of dust occurs it should preferably be removed by vacuuming with equipment fitted with a HEPA filter. Also, when handling the adsorbent the wearing of goggles or glasses and respiratory gear is recommended.

In order to further illustrate the present invention and the advantages thereof, particularly in the adsorption of oil from water, the following specific example is given, it being understood that same is intended to be only illustrative and in no way limitative.

EXAMPLE 4000 grams of the described adsorbent were added to a liter of water containing oil and grease and containing dissolved and undissolved solids. The adsorbent resulted in removal of substantially all the oils and greases and all measurable dissolved solids contained in the water sample. The data is depicted in Table I.

TABLE 1

| IMPURITY | AMOUNT IMPURITY BEFORE ADSORBENT ADDED (mg/l) | AMOUNT IMPURITY REMAINING AFTER ADSORBENT ADDED (mg/l) | % REMOVED |
|---|---|---|---|
| Oil & Grease | 6391 | 1.2 | 99.8 |
| Solids | 15200/15100[1] | 34,300[2] | −126.4[3] |

[1]Dissolved solids/Undissolved solids.
[2]Undissolved solids after addition of adsorbent which reflects additional weight of added adsorbent.
[3]Percentage = (Undissolved solids after adsorbent added) − (undissolved solids before adsorbent added)/(Dissolved solids before adsorbent added) × 100.

To ensure the accuracy of the above results, the amount of oil and grease and dissolved solids in two known reference samples were measured. The results are depicted in Table II below.

TABLE II

| Sample | Impurity | Amount of Impurity (mg/l) | Acceptable Limit (mg/l) |
|---|---|---|---|
| EPA WP379-3 | Oil & Grease | 17.0 | 8.8–26.5 |
| EPA WP1185-3 | Dissolved Solids | 146 | 115–175 |

Accordingly, the results of the control samples are well within the acceptable limits.

From the above results it can be seen that the subject composition is a very effective oil and grease adsorbent since addition of the adsorbent resulted in removal of substantially all the oil and grease contained in a heavily contaminated water sample. Also, the adsorbent is very effective in adsorbing solid impurities since the addition of the adsorbent resulted in removal of all measurable dissolved solids contained in the water sample.

Although the invention has been described with preferred embodiments, it is to be understood that variations and modifications may be used as will be appreciated by those skilled in the art. Such variations are to be considered within the scope of the following claims.

What is claimed is:

1. A method for adsorbing animal wastes comprising contacting an area containing animal waste with an effective amount of an adsorptive composition comprising sugar, vinegar, and diatomaceous earth combined in relative amounts which result in a composition with good adsorptive capacity.

2. A method for adsorbing chemicals used in transformers which comprise contacting an area contaminated with chemicals used in transformers with an effective amount of an adsorbent comprising sugar, vinegar and diatomaceous earth wherein the sugar, vinegar, and diatomaceous earth are combined in relative amounts which result in a composition with adsorptive capacity.

* * * * *